United States Patent
Scearce et al.

(10) Patent No.: US 7,054,127 B1
(45) Date of Patent: May 30, 2006

(54) METHODS AND APPARATUS TO PROTECT AGAINST VOLTAGE SURGES

(75) Inventors: Stephen A. Scearce, Cary, NC (US); Pongsak Sriwudhthanun, Chapel Hill, NC (US); James C. Q. Tran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 10/464,686

(22) Filed: Jun. 18, 2003

(51) Int. Cl.
*H01C 7/12* (2006.01)
*H02H 1/00* (2006.01)
*H02H 1/04* (2006.01)
*H02H 3/22* (2006.01)
*H02H 9/06* (2006.01)

(52) U.S. Cl. ..................... 361/119; 361/91.1; 361/91.7

(58) Field of Classification Search ................ 361/119, 361/91.1, 91.7
See application file for complete search history.

(56) References Cited

U.S. PATENT DOCUMENTS

| | | | | |
|---|---|---|---|---|
| 4,903,161 | A * | 2/1990 | Huber et al. ................... | 361/56 |
| 5,629,826 | A * | 5/1997 | Roca et al. .................. | 361/118 |
| 5,666,452 | A * | 9/1997 | Deitz et al. .................. | 385/100 |
| 5,835,326 | A * | 11/1998 | Callaway ..................... | 361/111 |
| 6,502,143 | B1 * | 12/2002 | Bass et al. ...................... | 710/1 |
| 6,530,087 | B1 | 3/2003 | Kobayashi et al. ......... | 725/125 |
| 6,556,564 | B1 | 4/2003 | Rogers ........................ | 370/352 |
| 6,664,771 | B1 | 12/2003 | Scoggins et al. ............ | 323/257 |
| 6,744,883 | B1 | 6/2004 | Bingel et al. .......... | 379/399.01 |

* cited by examiner

*Primary Examiner*—Phuong T. Vu
*Assistant Examiner*—Ann Hoang
(74) *Attorney, Agent, or Firm*—BainwoodHuang; David E. Huang, Esq.

(57) ABSTRACT

A cable device includes an integrated surge protection circuit. In the event that, communication signals conveyed by the cable include (potentially damaging) transient voltages, the surge protection circuit integrated in the cable suppresses the transient voltages at a distance from a corresponding electronic circuit to which the cable is attached. Consequently, potentially damaging voltage transients imparted on the communication signals are clamped before reaching potentially sensitive inputs of the electronic circuit.

26 Claims, 6 Drawing Sheets

METHODS AND APPARATUS TO PROTECT AGAINST VOLTAGE SURGES

BACKGROUND OF THE INVENTION

Cables have long been used to transfer signals between computers and other electrical systems. Depending on an operating environment, a cable and/or its internal signals may be susceptible to power or voltage surges. For example, surges can be caused by lightning, static electricity, temporary ground differences, or even glitches in power supply sources. Failing to provide adequate protection against these transient voltage spikes (received through cables) typically results in a substantial amount of damage to electronic equipment every year.

Lightning strikes can cause temporary ground differences between two or more communicating devices, disrupting communication and causing circuit damage. For example, during normal operation, a remote device may send a communication signal referenced to its corresponding (remote) ground. Depending on a system's configuration, a local device may not be able to receive the communication signal unless its ground reference approximates that of the remote ground reference. However, during a lightning strike, the remote ground reference may substantially increase for a brief instant of time, thereby imparting excessive voltage onto a communication signal transmitted to the local device. If the local device is not properly protected, it may be damaged as a result of the excessive voltage imparted on the communication signal (caused by the lightning strike).

To protect against surges, a conventional approach involves dissipating power surges via suppression circuits that clamp an input voltage to a level that does not cause damage to a corresponding electronic circuit that receives the signal. Suppression circuits include transzorbs, zener diodes, arrestor devices such as metal oxide varistors, carbon blocks, thyristors, gas discharge tubes and the like. Typically, these clamping circuits are disposed directly on a circuit board including sensitive functional circuitry that needs protection against potentially damaging surges.

Another technique of protecting against surges involves the use of an optical isolator disposed in series with an electrical cable. Such a device converts an electrical signal potentially including transient voltage spikes to an optical signal. The optical signal is then converted back to an electrical signal and transmitted to a target device. Generally, optical devices support protocols such as RS-232.

A more sophisticated method of protecting against power surges is to employ detector circuits that detect the presence of a lightning storm during which a surge is likely to occur. In response to detecting such a dangerous condition, the detector circuits cause electronic equipment to be mechanically disconnected (via relays) from an external cable connection while the threat of the surge (e.g., a lightning storm) remains present. After the threat has subsided, the cable equipment is then reconnected to the cable again.

SUMMARY

Unfortunately, there are deficiencies associated with conventional methods of suppressing transient voltage spikes imparted on cables (or corresponding internal electrical signals) that may otherwise couple to and damage circuit boards. For example, circuit board space constraints may not allow the inclusion of voltage suppression circuits directly on a circuit board to protect against voltage spikes received through the cable.

Even if space is available and a (susceptible) circuit board can be redesigned to include appropriate voltage suppression circuits, the on-board solution of including protection circuitry directly on the circuit board does not address the high cost of retrofitting or replacing unprotected circuits boards already in the field. Consequently, vulnerable circuit boards such as those supporting potentially life-critical applications must be replaced with surge-protected circuit boards.

Additionally, a conventional technique of employing an optical isolator in series with a cable has deficiencies. For example, such devices are often quite slow and therefore do not provide proper communication bandwidth. According to yet another conventional technique, disconnecting a cable from corresponding equipment during a threatening condition may render the equipment inoperable for extended periods of time. In most situations (such as life critical applications), this is unacceptable.

It is an advancement in the art to provide a cable including an integrated surge protection circuit in order to reduce or eliminate damage caused by transient voltages received over a cable or its internal signals. Accordingly, one embodiment of the present invention is directed towards a cable device integrated to include a (transient voltage) surge protection circuit. In the event that, e.g., communication signals conveyed by the cable include transient voltages, the suppression circuit integrated in the cable suppresses the transient voltages at a distance from a corresponding electronic circuit to which the cable is attached.

More specifically, the surge protection circuit in the cable includes one or more clamping circuits coupled to a ground reference. For example, a conductor such as a cylindrical conductive shield associated with the cable provides a path between the surge protection circuit and a ground reference of the electronic circuit. When transient high voltage are imparted on communication signals in the cable, the surge protection circuit integrated in the cable clamps the voltage transients of the communication signals so that they do not otherwise cause damage to inputs of the electronic circuit. That is, during the clamping process (via clamping circuits in the surge protection circuit), current associated with the transient voltage travels on the conductor of the cable to the ground reference associated with the electronic circuit. Consequently, the high voltage transients are clamped before reaching inputs of the electronic circuit.

According to one embodiment, the surge protection circuit is located between 2 and 30 inches from an end of the cable that attaches to the electronic circuit. Thus, the surge protection circuit integrated with the cable suppresses transient voltages prior to reaching the electronic circuit.

According to another embodiment, the clamping circuit is disposed on a printed circuit board (or flex circuit) integrated into a connector assembly of the cable at an end of the cable opposite the end that couples to the electronic circuit. To provide protection against environmental elements, the printed circuit board including the clamping circuits can be encapsulated with moldable plastic.

The cable and integrated surge suppression circuit can be an extension cable. For example, a communication system may initially include an original cable that conveys communication signals to an electronic circuit. To protect the electronic circuit from potentially damaging voltage transients, one end of the extension cable is plugged into the original cable and the other end is plugged into the electronic circuit to provide a path for communication signals between the original cable and the electronic circuit device. The transient voltage suppression circuit disposed in the extension cable suppresses transient voltages imparted on the communication signals so that they do not damage the electronic circuit.

In one embodiment, the cable includes at least one internal conductor allocated for supporting a reception of mode bit information at the electronic circuit. A state of the mode bit information identifies a protocol associated with the communication signals received over the cable at the input of the electronic circuit.

The surge protection device optionally includes a connector that removably attaches to a connector of another cable. The connector of the other cable may include internal terminations defining mode bit information identifying a mode in which to receive the communication signals at the electronic circuit. A state of the internal terminations are conveyed to the electronic circuit via internal conductors of the cable. Clamping circuits can be provided to protect against voltage transients on the internal signals of the cable defining mode bits.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily drawn to scale, emphasis instead being placed upon illustrating the principles of the present invention.

DETAILED DESCRIPTION

An embodiment of the present invention is directed towards a cable device integrated to include a (transient voltage) surge protection circuit. In the event that, communication signals conveyed by the cable include (damaging) transient voltages, the surge protection circuit integrated in the cable suppresses the transient voltages at a distance from a corresponding electronic circuit to which the cable is attached. For example, a conductor such as a cylindrical conductive shield associated with the cable provides a path between the surge protection circuit and a ground reference of the electronic circuit. When transient voltages are imparted on communication signals in the cable, the surge protection circuit clamps the voltage transients and current associated with the transient voltage travels on the conductor of the cable to the ground reference of the electronic circuit. Consequently, high voltage (and potentially damaging) transients imparted on the communication signals are clamped before reaching an input of the electronic circuit.

Although the techniques described herein are suitable for use in communication systems, and particularly to applications employing protection against transient voltage surges received on communication signals, the techniques are also well-suited for other applications employing surge protection.

Figure 1:
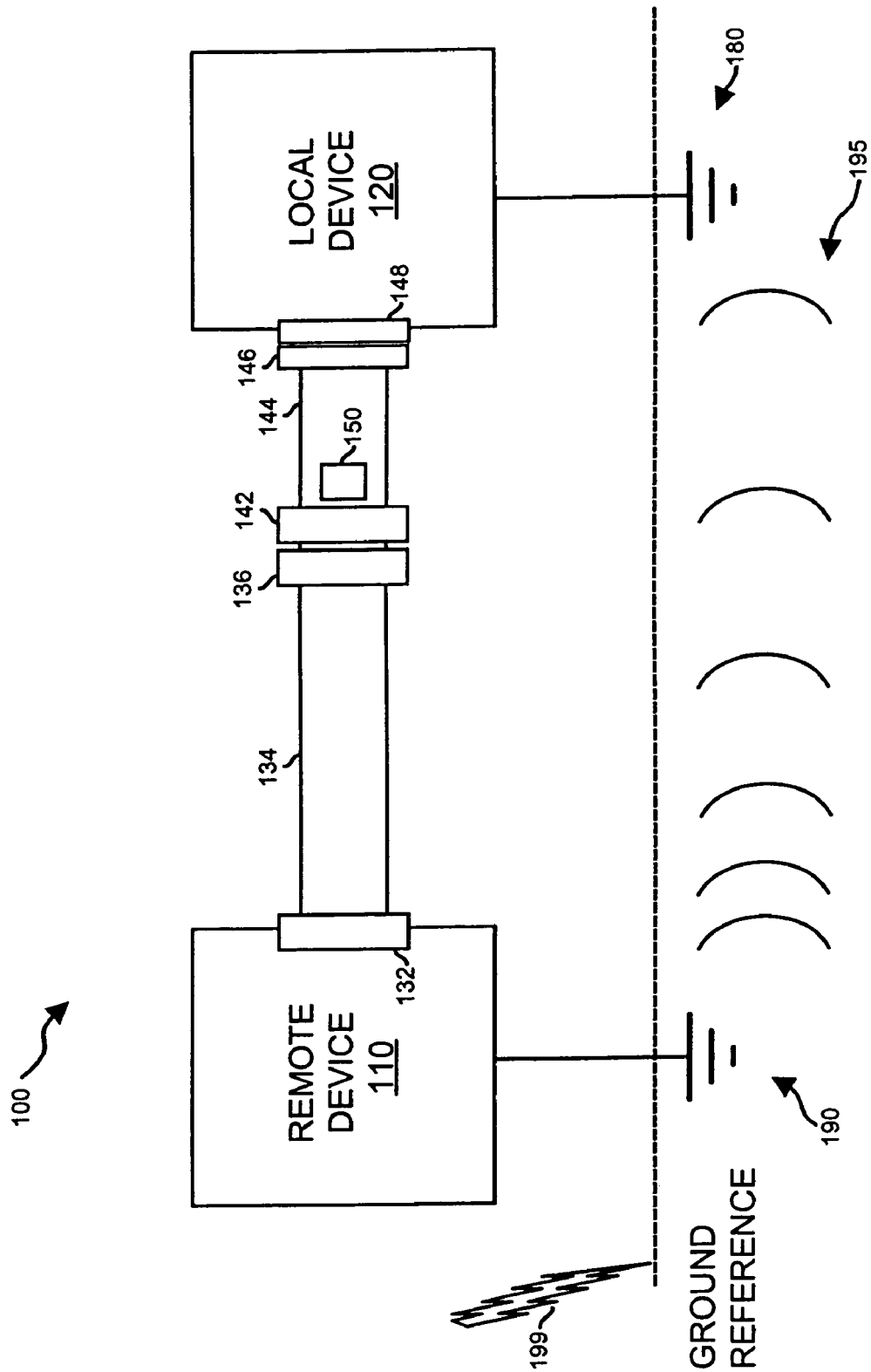
FIG. 1 is a block diagram of a communication system including a surge protection device to prevent damage to inputs of an electronic circuit.

FIG. 1 is block diagram of communication system 100 for transmitting and receiving communication signals between remote device 110 and local device 120 according to an embodiment of the invention. As shown, communication system 100 includes remote device 110, local device 120, electrical cable 134 (such as a 'smart' cable produced by Cisco), and electrical cable 144.

Based on coupling provided by electrical cables 134, 144, a connective path extends between remote device 110 and local device 120. One end of electrical cable 134 couples directly to remote device 110 while the other end includes connector 136 that couples to connector 142 at end of electrical cable 144. At an opposite end of connector 142, electrical cable 144 includes connector 146 that couples electrical cable 146 to connector 148 of local device 120. Thus, in one respect, cable 146 acts as an extension cable to couple electrical cable 134 to local device 120.

Surge protection circuit 150 disposed or integrated in electrical cable 134 suppresses transient voltages imparted on electrical cable 144 to protect local device 120 against potential damage. For example, remote device 110 generates electrical signals (referenced with respect to remote ground 190) such as communication signals through electrical cable 134 and electrical cable 144 to local device 120. During normal operation, when there are no lightning 199 strikes, remote ground 190 and local ground 180 are approximately equal. Thus, local device 120 can receive and decipher electrical signals because its receiver circuitry is referenced to approximately the same ground as that of the remote device 110.

However, during a lightning storm, lightning 199 causes remote ground reference 190 to increase (or decrease) dramatically compared to local ground reference 180. Similarly, lightning 199 may strike in a region causing local ground reference 180 to change with respect to remote ground reference 190. This is largely due to voltage differential 195 (gradient) produced by lightning 199. For example, charged particles at the remote ground reference 190 cause it to increase or decrease. As a result of a large difference between remote ground reference 190 and local ground reference 180 during lightning 199, electrical signals generated by remote device 110 through electrical cable 134 include potentially damaging transient voltages because remote device 110 generates electrical signals with respect to its own remote ground reference 190.

Surge protection circuit 150 integrated into electrical cable 144 protects local device 120 from potentially damaging transient voltages caused by environmental conditions such as lightning 199 (static electricity discharge, etc.). For example, surge protection circuit 150 suppresses high transient voltages imparted through electrical cable 134 before they would otherwise reach and damage potentially sensitive electrical inputs of local device 120. This is discussed more particularly in connection with the following figures.

Figure 2:
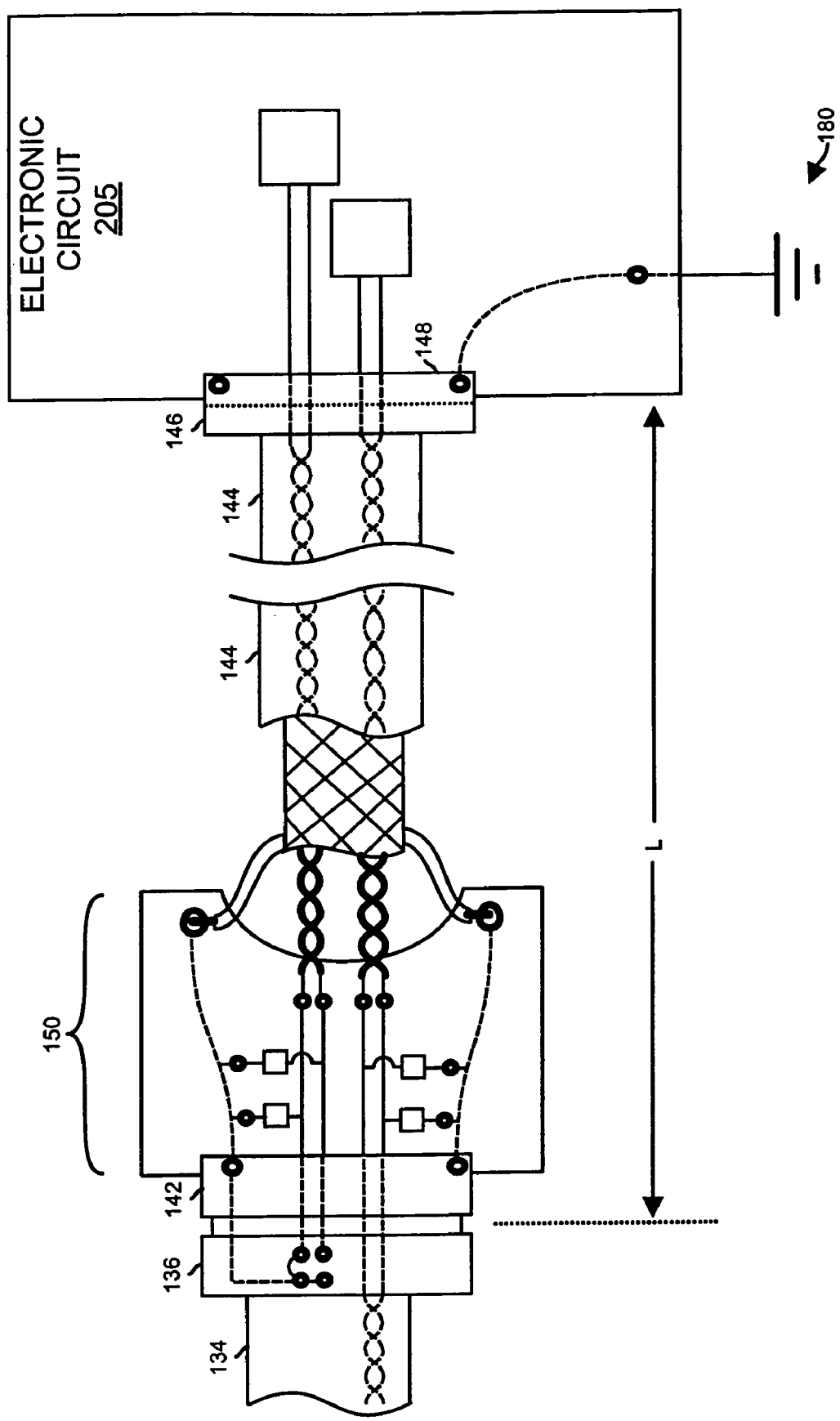
FIG. 2 is a pictorial diagram of a surge protection circuit integrated into a cable.

FIG. 2 is a pictorial diagram illustrating a technique of suppressing transient voltages according to an embodiment of the invention. As shown, electrical cable 144 between respective connectors 142, 146 measures length, L. According to one embodiment, L is between two and thirty inches in length. In a typical application, electrical cable 144 including connectors 142, 146 is eight inches in length. Consequently, transient voltages imparted on signals in electrical cable 134 (conveyed through connectors 136, 142 bound for electronic circuit 205) are suppressed by surge protection circuit 150 between two and thirty inches from electronic circuit 205. Length, L, however may be more than thirty inches or less than two inches depending on the application. Typically electrical cable 134 is between 3 and a hundred or more feet long.

Figure 3A:
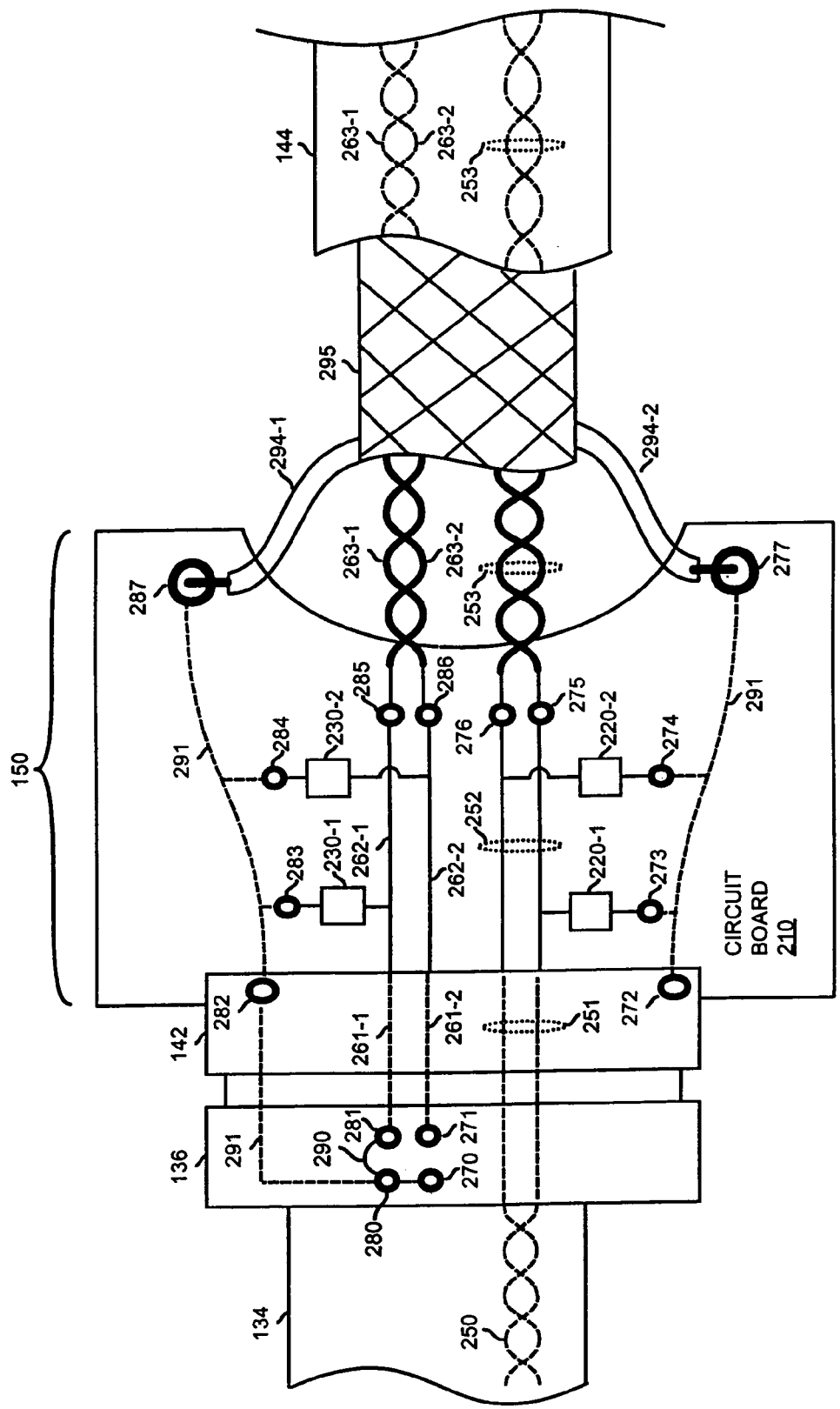
FIG. 3A is a pictorial diagram of one end of a cable integrated to include a surge protection circuit.
Figure 3B:
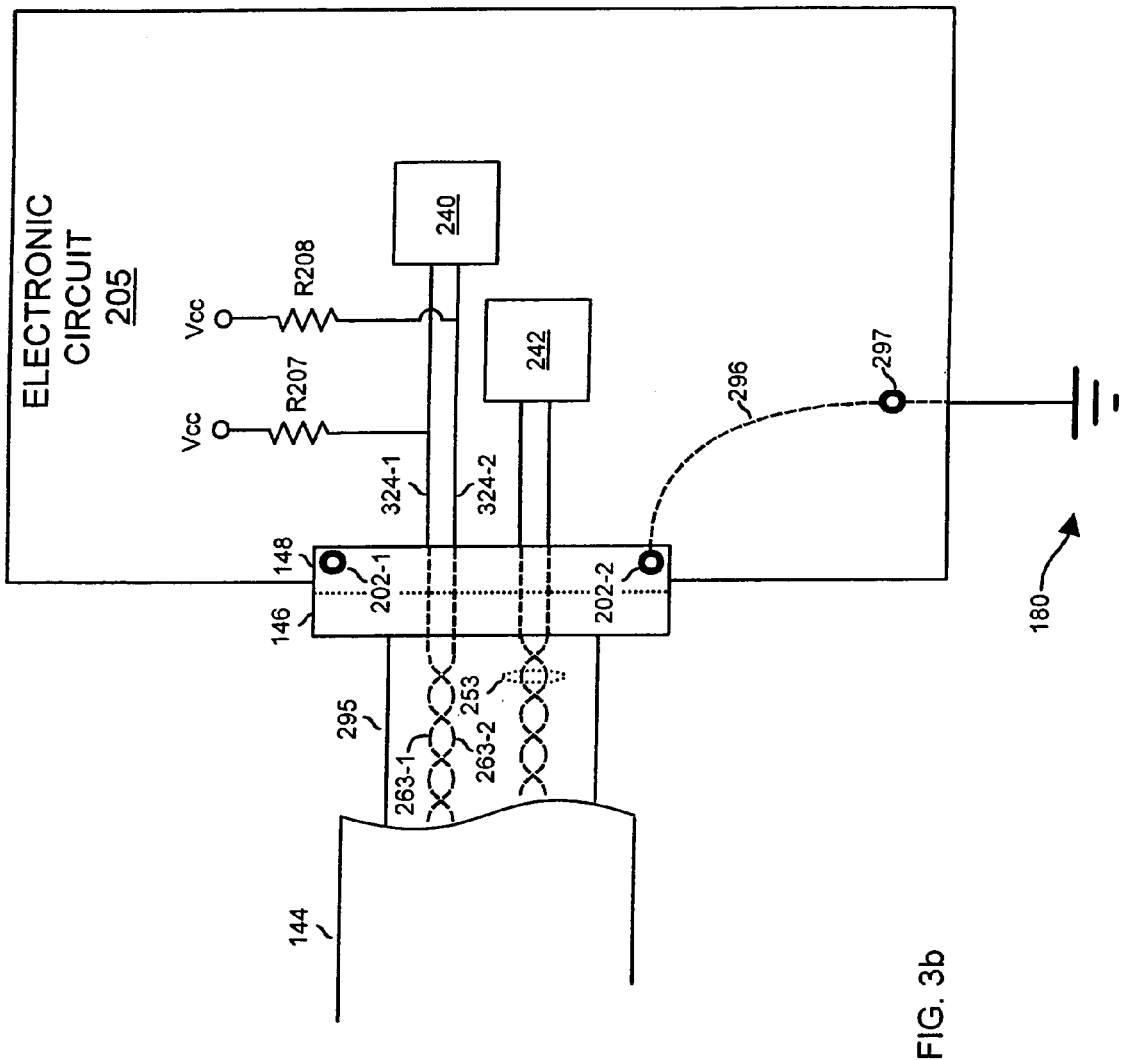
FIG. 3B is a pictorial diagram of another end of a cable integrated to include a surge protection circuit.

FIGS. 3A and 3B are pictorial diagrams illustrating surge protection circuit 150 in relation to electrical cables 134, 144 and electronic circuit 205. As shown (in FIG. 3A), electrical cable 134 includes one or multiple twisted pair of wires 250 that couple to connector 136. Connector 136 includes termination points 271, 281, shunt(s) 290, contacts 270, 280, and ground path 291. Connector 142 includes ground path 291, signal paths 251, 261, and ground reference contacts 272, 282. Surge protection circuit 150 includes circuit board 210, ground paths 291, vias (such as electrical nodes of a layered circuit board) 273, 274, 283, 284, clamping circuits 220, 230, circuit traces 252, 262, and barrels (such as electrical nodes of a layered circuit board) 275, 276, 277, 285, 286, 287. In FIG. 3B, electrical cable 144 includes twisted pairs of wire 253, 263, shield(s) 295, and connector 146. Electronic circuit 205 includes connector 148, ground path 296, resistors R207, R208, and signal interfaces 240, 242.

As discussed and in connection with components in both FIGS. 3A and 3B, electrical cable 134 and electrical cable 144 convey electrical signals from remote device 110 to local device 120 (including circuit board 205). Initially, remote device 210 transmits signals onto twisted pair of wires 250 to connector 136. Signal path 251 conveys electrical signals through connectors 136, 142 to traces 252 and barrels 275, 276 of circuit board 210. In addition to traces 252, barrels 275, 276 of circuit board 110 couple to receive ends of twisted pair of wires 253 of cable 144. In turn, twisted pair of wires 253 couple to connector 146 at the other end of electrical cable 144 and signal interface 242 of electronic circuit 205. In this way, electrical signals from cable 134 and, more specifically remote device 110, extend through cable 144 to electronic circuit 205.

In one embodiment, remote device 110 drives one or multiple serial differential communication signals such as those based on RS-232, RS-449, etc. through electrical cables 134, 144 to signal interface 242 of electronic circuit 205. In the event that lightning 199 strikes in a vicinity of remote device 110, electrical signals conveyed on twisted pair of wires 250 potentially include transient high voltages. Such transient high voltages from twisted pair of wires 250 travel along signal path 251 (along with communication signal itself) to circuit board traces 252 of circuit board 210. Generally, clamping circuits 220 clamps transient voltages to a non-harmful threshold voltage level such as +/−16 volts. The associated ground reference of clamping circuits 220 extends from circuit board 210 to ground reference 180 of electronic circuit 205.

For example, one end of clamping circuits 220 connects directly to vias 273, 274 to ground path 291. Cable 144 includes a conductor such as shield 295 (such as braided wire and/or metal foil) to couple ground path 291 (of circuit board 210) to ground path 296 of electronic circuit 205. More specifically, ground path 291 (such as a planar ground reference) disposed in a layer of circuit board 210 (such as a perforated circuit board, flexible circuit board, etc) electrically connects an end of clamping circuits 220 and vias 273, 274 to barrel 277 (such as a through-hold trace contact for soldering a conductor 294). Conductor 294 electrically connects barrels 277, 287 to shield 295. In turn, shield 295 electrically couples through connectors 146, 148 to contacts 202 associated with connector 148. Contacts 202 of connector 148 couple shield 295 to ground path 296 (such as ground plane of electronic circuit 205), which in turn is electrically connected through contact 297 to ground reference 180. Consequently, during a lightning 199 strike, clamping circuit 220 of surge protection circuit 150 clamps transient voltages (such as 100 volt spikes) prior to otherwise reaching sensitive inputs of signal interface 242 of electronic circuit 205. Thus, the addition of electrical cable 144 (extension cable) in series with electrical cable 134 (original cable) not only enables one to position remote device 110 and local device 120 farther apart from each other, it also provides a level of protection against voltage surges without having to replace electronic circuit 205 with surge protection circuitry on its front end prior to inputs of signal interfaces 240, 242.

To provide protection against environmental elements, printed circuit board 210 and corresponding electronic components such as clamping circuits 220, 230 are encapsulated with moldable (non-conductive) plastic. Electrical cable 144 also includes a plastic nonconductive coating (insulation). Consequently, circuit board 210 appears as a portion of electrical cable 144 between connector 142 and 146.

In one embodiment, connector 136 associated with cable 134 includes one or multiple shunts 290 (e.g., jumpers, zero ohm resistors, low impedance conductors, etc.) to identify one of potentially different types of setups associated with electrical cable 134. In one application, connector 136 includes up to four shunts 290. An example of shunts 290 and how they may be used in connector 136 is more particularly shown in U.S. Pat. No. 6,004,150 issued on Dec. 21, 1999 to Chapman, et al. Based on the configuration of supporting 4 mode bits in connector 136 (two are shown in FIG. 3A, namely, signal path 261-1 and 261-2), a corresponding cable 134 can be configured as one of up to sixteen different types of cables. Thus, a cable itself and presence of shunts 290 indicates information about the cable type.

Electronic circuit 205 reads a status of whether shunts 290 are present in connector 136 for each corresponding dedicated signal to, in turn, configure itself to communicate (transmit and receive) information according to one for multiple protocols. For example, different pairs of wire in cable 134 will be dedicated (by electronic circuit 205) to transmitting and/or receiving data information according to one or more selected protocols based on a setting of mode bits. As shown, connector 136 supports two mode bits, one of which is set to a logic low state (path associated with signal path 261-1 including shunt 290) and the other of which is set to a logic high state (path associated with signal path 261-2 not including shunt 290).

Electronic circuit 205 senses a corresponding type of cable 134 by detecting a presence of shunts 290 at signal interface 240. For example, pull up resistors R207 and R208 (such as 1000 ohm resistors) pull-up respective voltages imparted at circuit traces 324 on electronic circuit 205. In the event that a corresponding shunt 290 is present in connector 136, a corresponding trace is pulled to ground or logic low. For example, a trace of electronic circuit 205 (such as trace 324-1 coupled to wire 263-1 connected to trace 262-1 of circuit board 210) is pulled down to ground via a path including shunt 290 ground path 291 (through connectors 136, 142) to contact 282. Ground path 291 is coupled to contact 282 which is coupled to local ground reference 180 of electronic circuit 205 through a circuit path including conductor 294, shield 295, contacts 202, signal path 296, and via 297 similar to the path as previously discussed for use in clamping circuits 220. Thus, as shown, circuit trace 324-1 is pulled to ground through shunt 290 across termination point 281 and contact 280 of connector 136.

Notably, there is no shunt 290 present across termination point 271 and contact 270 of connector 136. Thus, a circuit path including circuit trace 324-2, wire 263-2, trace 262-2 to termination point 271 is not pulled-down to ground reference 180 and a corresponding voltage sensed on circuit trace 324-2 at signal interface 240 is a logic high voltage.

Similar to traces 252 and a corresponding circuit path to electronic circuit 205, traces 324 of circuit board 205 and, more specifically, inputs of signal interface 240 are also protected from transient voltages. For example, traces 324 electrically couple through connectors 146, 148 to corresponding wires 263 of electrical cable 144. Wires 263 of electrical cable 144 in turn couple to circuit traces 262 and corresponding clamping circuits 230. In the event of a transient voltage on circuit traces 262, clamping circuits 230 clamp the transient voltage via a circuit path including ground path 291, conductor 294, shield 295, connectors 146, 148 ground path 296, via 297 to local ground reference 180 similar to that as previously discussed for clamping circuit 220. Consequently, inputs of signal interface 240 are also protected from potentially damaging transient voltages.

Figure 4:
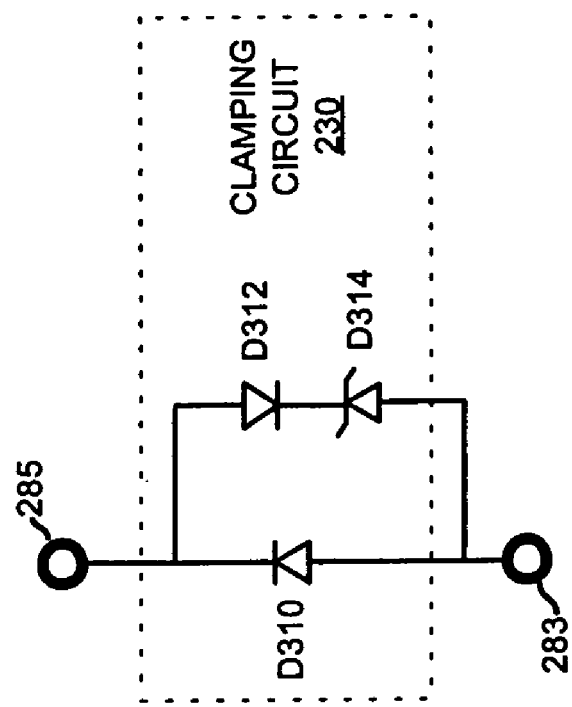
FIG. 4 is a circuit diagram of a voltage clamping circuit.

FIG. 4 is a diagram of clamping circuit 230 according to an embodiment of the invention. As shown, clamping circuit 230 includes diodes D310, D312, and D314.

In operation, contact 283 electrically connects to ground path 291. Thus, during the occurrence of positive transient voltages (potentially caused by lightning 199) imparted on contact 285, diode D312 turns on (forward biased) and diode D314 such as a fast-acting zener diode with low-capacitance clamps voltage based on its characteristic reverse breakdown voltage such as +6 volts. During the occurrence of negative transient voltage (potentially caused by lightning 199) imparted at contact 285, diode D310 turns on (forward biased) to clamp the voltage at contact 283 so that it does not go below −1 volts. Consequently, wires 263 and corresponding inputs of signal interface 240 are protected against voltage transients.

Depending on the embodiment, clamping circuit 230 may include components such as transzorbs, fast-acting TVS zener diodes, arrestor devices such as metal oxide varistors, carbon blocks, thyristors, gas discharge tubes and the like.

Figure 5:
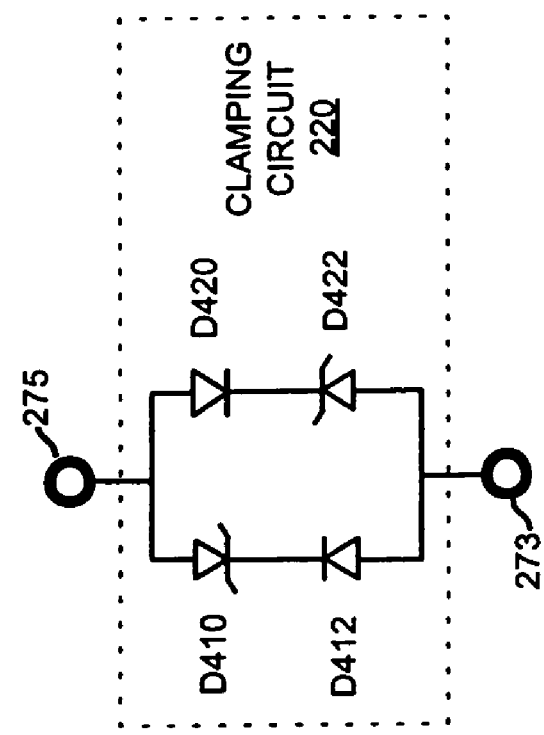
FIG. 5 is a circuit diagram of a voltage clamping circuit.

FIG. 5 is a diagram of clamping circuit 220 according to one embodiment of the invention. As shown, clamping circuit 220 includes diodes D410, D412, D420, and D422. Generally, node 275 of circuit board 210 is protected against transient voltages. For example, during a negative transient voltage at node 275, diode D412 turns on (forward breakdown voltage=1.0 v) as well as D410 (e.g., reverse breakdown voltage=−15 v). Clamping circuit 220 thus clamps a voltage at node 275 so that it does not go below −16 volts. Diodes D420 and D422 are symmetrically disposed as D410 and D412 but in a reverse direction between node 275 and ground path 273. Thus, node 275 is protected against positive transient voltages (e.g., +16 volts).

Depending on the embodiment, clamping circuit 220 may include components such as transzorbs, fast acting diodes, fast-acting TVS zener diodes, arrestor devices such as metal oxide varistors, carbon blocks, thyristors, gas discharge tubes and the like.

Figure 6:
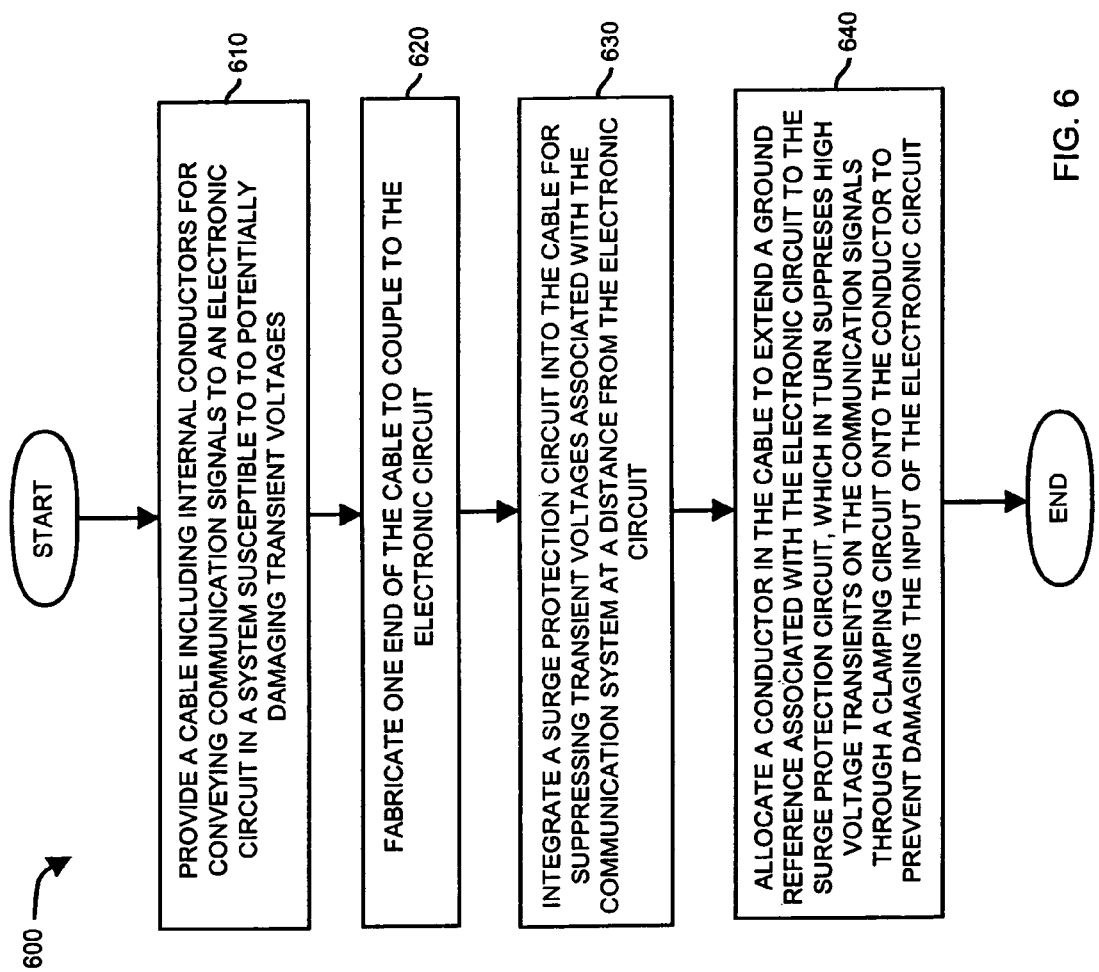
FIG. 6 is a flowchart illustrating a method of fabricating a cable to include a surge protection circuit.

FIG. 6 is a flow chart for fabricating cable 144 according to an embodiment of the invention.

In step 610, an assembler provides a cable 144 including internal conductors (such as wires 253, 263) for conveying communication signals to electronic circuit 205 disposed in communication system 100 susceptible to potentially damaging transient voltages.

In step 620, the assembler produces one end of cable 144 to include connector 146 for coupling cable 144 to electronic circuit 205.

In step 630, the assembler integrates surge protection circuit 150 into cable 144 for suppressing transient voltages associated with communication system 100 at a distance from electronic circuit 205.

In step 640, the assembler allocates a conductor in the cable (such as shield 295) to extend a ground reference of electronic circuit 205 to circuit board 210 of surge protection circuit 150. As previously discussed, surge protection circuit 150 suppresses transient high voltages on traces 252, 262 to prevent damage to inputs (or outputs) of electronic circuit 205.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A surge protection device comprising:
a cable that supports conveying communication signals to an input of an electronic circuit, the cable including:
a surge protection circuit integrated to suppress transient voltages imparted on the communication signals; and
a conductor that extends a ground reference associated with the electronic circuit through the cable to the surge protection circuit, the surge protection circuit including clamping circuits to suppress the transient voltages of the communication signals onto the conductor associated with the cable to prevent damaging the input of the electronic circuit; and
a connector that removably attaches to a connector of another cable, the connector of the other cable including internal terminations that identify a mode in which to receive the communication signals at the electronic circuit, a state of the internal terminations conveyed to the electronic circuit via internal conductors of the cable.

2. A surge protection device as in claim 1, wherein the cable includes at least one internal conductor allocated for supporting reception of mode bit information at the electronic circuit whose state identifies a protocol associated with the communication signals received at the input of the electronic circuit.

3. A surge protection device as in claim 1, wherein the cable is an extension cable for linking an original cable to the electronic circuit and communication signals conveyed by the original cable are susceptible to high voltage transients.

4. A surge protection device as in claim 1, wherein the conductor is a cylindrical conductive shield surrounding internal twisted pairs of wires in the cable that carry the communication signals to the electronic circuit.

5. A surge protection device as in claim 1, wherein the surge protection circuit is located between 2 and 30 inches from the electronic circuit when the cable is attached to convey the communication signals to the electronic circuit.

6. A surge protection device as in claim 1 further comprising:
moldable plastic that encapsulates the surge protection circuit.

7. A surge protection device as in claim 1, wherein the cable includes multiple conductors to support communication signals according to multiple serial communication protocols.

8. A surge protection device as in claim 1, wherein the surge protection device is disposed in a connector assembly at an end of the cable opposite the end of the cable that couples to the electronic circuit.

9. A surge protection device as in claim 1, wherein a voltage transient present on the other cable and directed to the electronic circuit on one of the communication signals is clamped by the surge protection circuit prior to being received by the input of the electronic circuit, the conductor of the cable that extends the ground reference from the electronic circuit including a path from the surge protection circuit through a wire of the cable to the ground reference associated with the electronic circuit.

10. A surge protection device as in claim 9, wherein the connector that removably attaches is a first connector and wherein the connector of the other cable is a second connector, the ground reference associated with the electronic circuit extending from the conductor coupled to the surge protection circuit through the first connector to the second connector, the first and second connector being coupled to each other, the second connector including a mechanism to receive the internal terminations that, if a respective one is present in the second connector, connects a respective one of the internal conductors of the cable to the ground reference of the electronic circuit such that the electronic circuit can identify a logic state associated with the respective one of the internal conductors.

11. A surge protection device as in claim 10, wherein the internal terminations present in the mechanism of the second connector indicate a respective configuration of the other cable and, in response to identifying a configuration of the other cable, the electronic circuit configuring the input to receive the communication signals according to the respective configuration as indicated by the internal terminations present in the mechanism of the second connector.

12. A surge protection device as in claim 11, wherein the electronic circuit includes pull-up resistors that pull-up a respective one of the internal conductors to a given non-zero voltage value unless a respective internal termination is present in the mechanism of the second connector coupling the respective one of the internal conductors to the ground reference a with the electronic circuit; and wherein the cable includes twisted pairs of wires for conveying the communication signals from the first connector to the electronic circuit and the conductor is a shield wrapped around the twisted pairs of wires.

13. A surge protection device comprising:
a cable means that supports conveying communication signals to an input of an electronic circuit, the cable means including:
a surge protection circuit means integrated to suppress transient voltages imparted on the communication signals; and
a conductor means that extends a ground reference associated with the electronic circuit through the cable to the surge protection circuit means, the surge protection circuit means including clamping circuits to suppress the transient voltages of the communication signals onto the conductor means associated with the cable means to prevent damaging the input of the electronic circuit; and
a connector means that removably attaches to a connector of another cable, the connector of the other cable including internal terminations that identify a mode in which to receive the communication signals at the electronic circuit, a state of the internal terminations conveyed to the electronic circuit via internal conductors of the cable.

14. A method comprising:
providing a cable including internal conductors for conveying communication signals to an input of an electronic circuit in a communication system susceptible to potentially damaging transient voltages;
fabricating one end of the cable to couple the internal conductors to the electronic circuit;
integrating a surge protection circuit into the cable for suppressing transient voltages associated with the communication signals on the internal conductors; and
allocating a conductor in the cable to extend a ground reference associated with the electronic circuit to the surge protection circuit integrated with the cable, the surge protection circuit suppressing high voltage transients of the communication signals through a clamping circuit onto the conductor to prevent damaging the input of the electronic circuit.

15. A method as in claim 14 further comprising:
surrounding the internal conductors of the cable with a cylindrical shield that extends to a ground reference associated with the electronic circuit to provide a path for dissipating voltage transients from the surge protection circuit.

16. A method as in claim 14 further comprising:
disposing the surge protection circuit to be a distance between 2 and 30 inches from the electronic circuit.

17. A method as in claim 14 further comprising:
disposing the surge protection circuit including a printed circuit board and corresponding voltage clamping circuits into a connector assembly at an end of the cable to clamp high voltage transients associated with the communication signals to a ground reference prior to otherwise reaching the electronic circuit.

18. A method as in claim 14 further comprising:
encapsulating at least a portion of the surge protection circuit with moldable plastic.

19. A method as in claim 14 further comprising:
utilizing the cable to support communication signals according to multiple serial communication protocols.

20. A method as in claim 14 further comprising:
disposing the surge protection circuit in a connector assembly at an end of the cable opposite the end of the cable that couples to the electronic circuit.

21. A method as in claim 14 further comprising:
fabricating the cable to be an extension cable that provides a connection between an original cable that, without the extension cable, would connect a remote device transmitting the communication signals to the electronic circuit;
the original cable including a shunt circuit that is selectively populated with at least one respective shunt component to set mode bits of the original cable, the mode bits being read by the electronic circuit through the extension cable and indicating a configuration of the original cable; and
fabricating the extension cable to include internal conductors that convey the respective mode bits of the original cable to the electronic circuit.

22. A method as in claim 21 further comprising:
surrounding the internal conductors of the cable with a shield that extends to a ground reference associated with the electronic circuit to provide a path for dissipating voltage transients from the surge protection circuit, the internal conductors being twisted pairs of wires for conveying the communication signals between original cable and the electronic circuit, the ground reference being extended to the shunt circuit of the original cable such that the ground reference from the electronic circuit is utilized by both the shunt circuit and the surge protection circuit.

23. In a system susceptible to potentially damaging voltage transients, a method comprising:

uncoupling an original cable supporting conveyance of communication signals to an electronic circuit device;

providing an extension cable including a transient voltage suppression circuit disposed thereon;

coupling one end of the extension cable to the original cable and another end of the extension cable to the electronic circuit device to provide a path for communication signals between the original cable and the electronic circuit device, the transient voltage suppression circuit disposed in the extension cable suppressing transient voltages imparted on the communication signals; and wherein coupling the extension cable to the electronic circuit device includes plugging one end of the extension cable into the electronic circuit device to provide a conductive path between the transient voltage suppression circuit of the extension cable and a ground reference associated with the electronic circuit device.

24. A method as in claim 23 further comprising:

utilizing the extension cable to support communication signals according to multiple serial communication protocols.

25. A method as in claim 23, wherein coupling the extension cable to the original cable establishes a connection of a shunt circuit of the original cable to the conductive path of the extension cable such that the shunt circuit in the original cable has a corresponding connection through the extension cable to the ground reference of the electronic circuit, the shunt circuit including at least one internal termination that pulls a respective signal from the electronic circuit to ground.

26. A method as in claim 25 further comprising:

populating the shunt circuit with the at least one internal termination to indicate the configuration of the original cable such that the electronic circuit can read a status of mode bits associated with the shunt circuit and identify how to configure itself to receive the communication signals transmitted from a remote device to the electronic circuit over the original cable and the extension cable.

* * * * *